July 14, 1964　　　C. E. ANGLIM ETAL　　　3,140,580
PARKING METER TIME CANCELLATION MECHANISM
Filed March 2, 1960　　　　　　　　　　　　　4 Sheets-Sheet 1
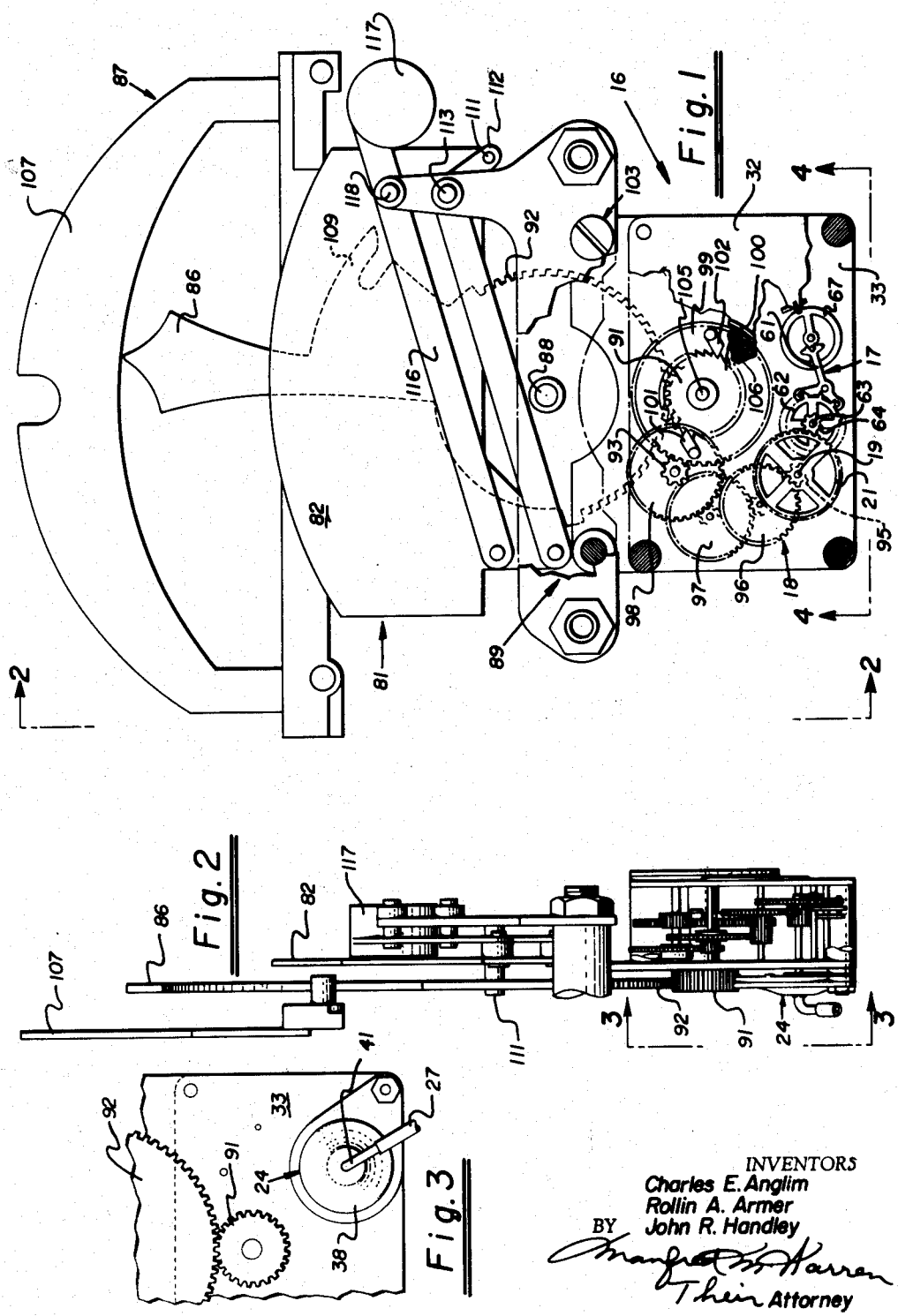
INVENTORS
Charles E. Anglim
Rollin A. Armer
John R. Handley
BY
Their Attorney

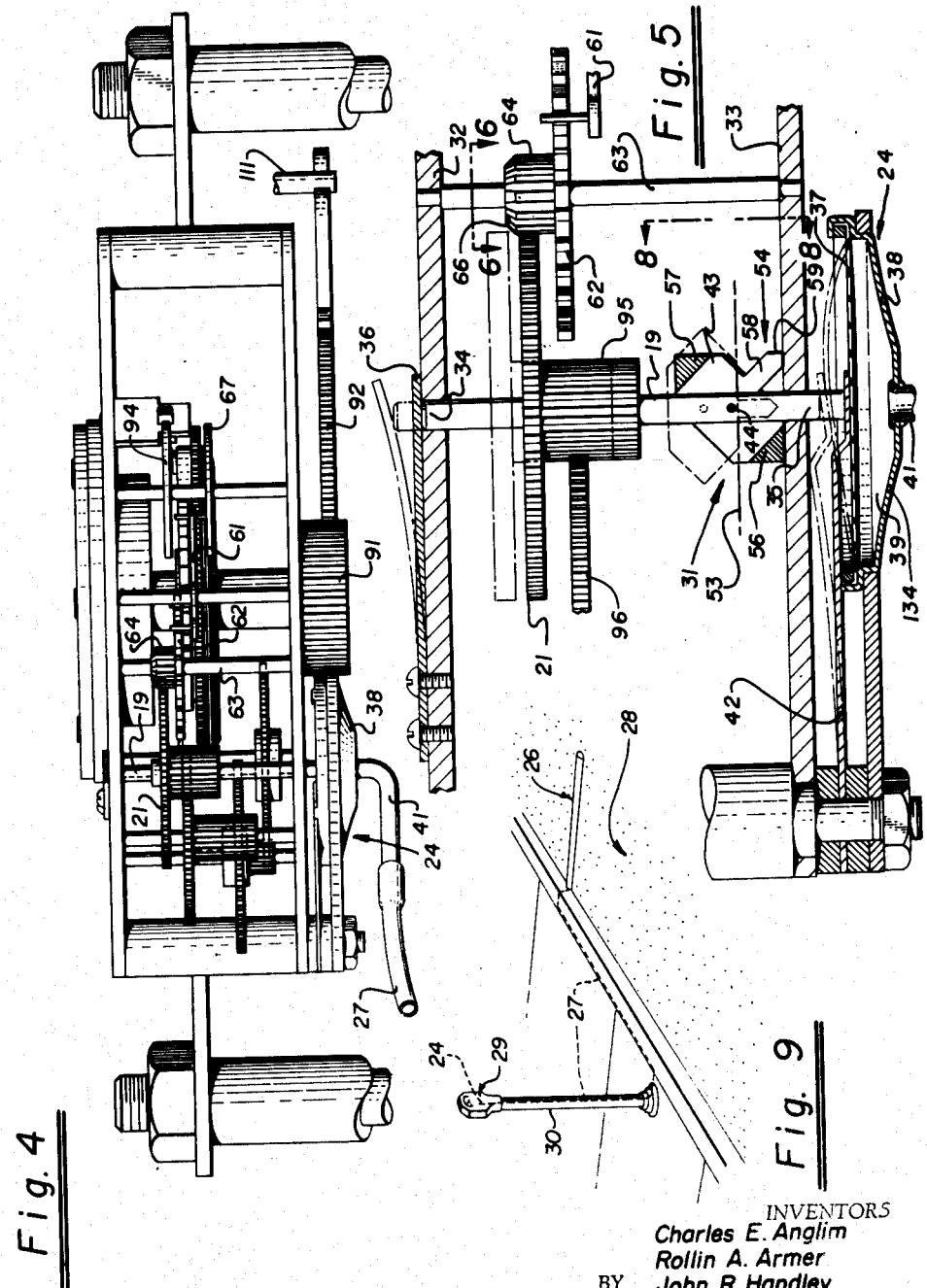

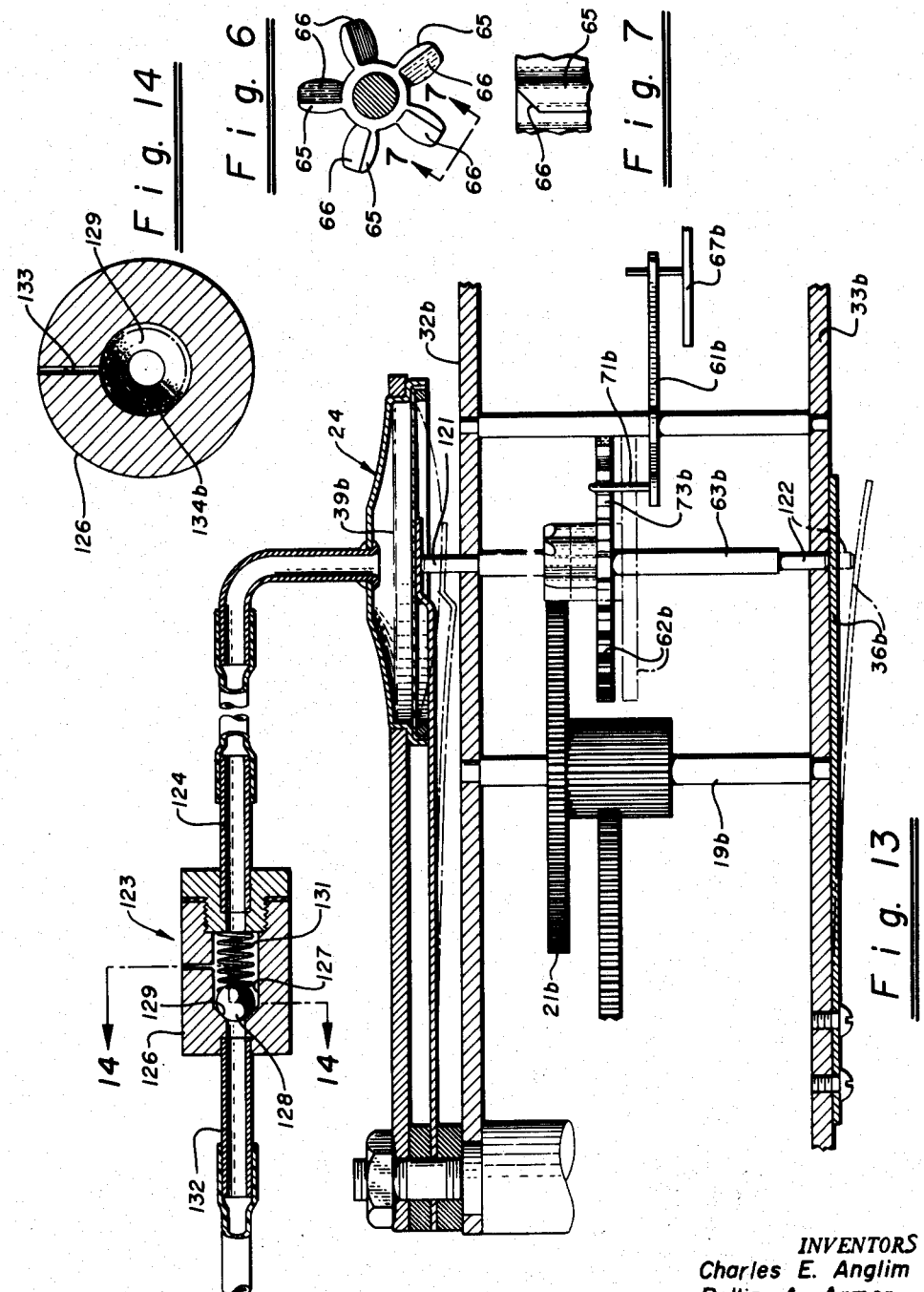

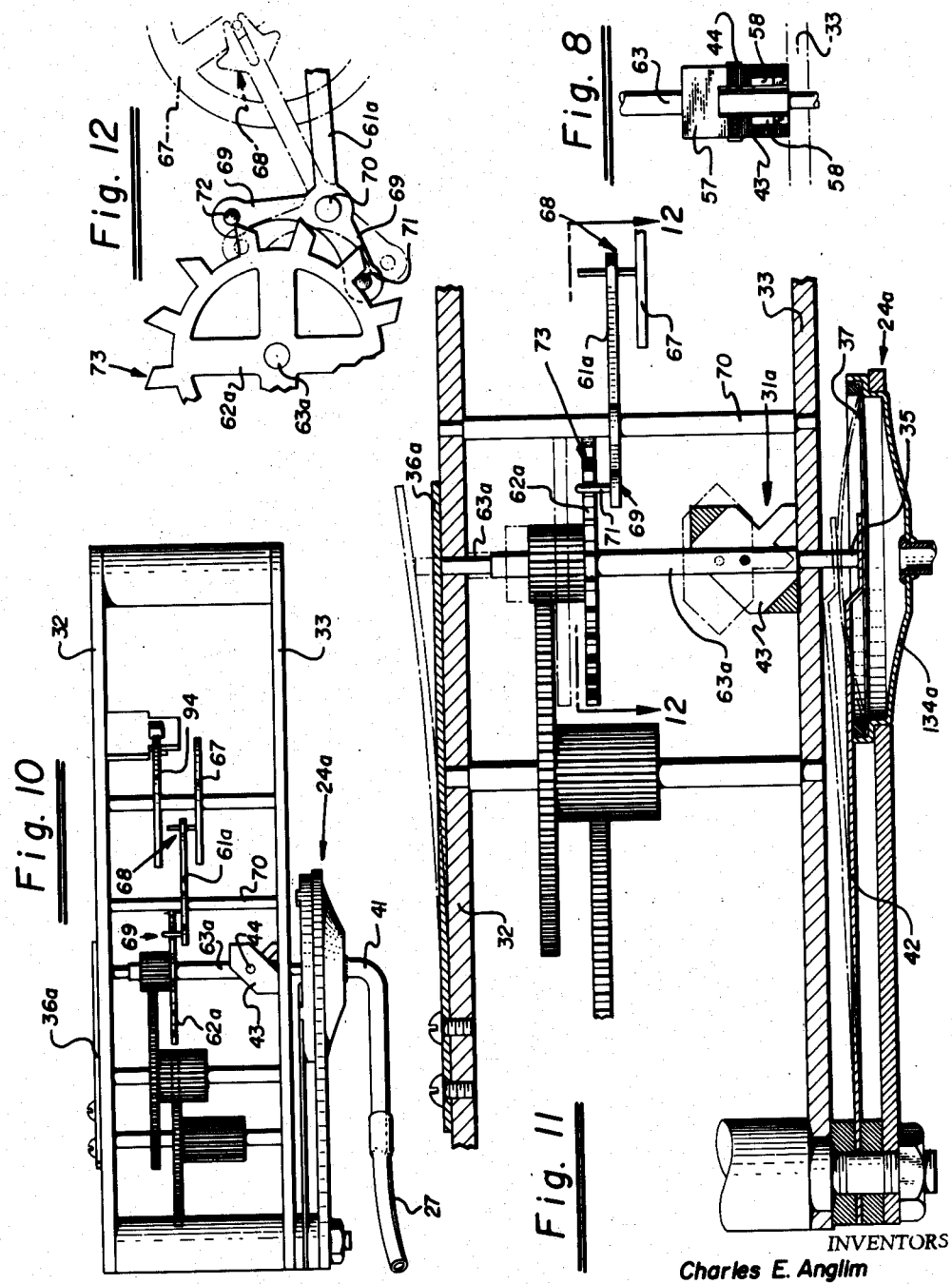

United States Patent Office
3,140,580
Patented July 14, 1964

3,140,580
PARKING METER TIME CANCELLATION MECHANISM
Charles E. Anglim and Rollin A. Armer, Berkeley, and John R. Handley, Los Altos, Calif., assignors to Calpat Products, Inc., a corporation of Nevada
Filed Mar. 2, 1960, Ser. No. 12,476
15 Claims. (Cl. 58—142)

The invention relates to clock mechanisms such as used in coin operated parking meters and more particularly to devices for returning the meter to its "zero" position to wipe out any remaining bought time as the vehicle leaves the parking space for which the meter is provided.

An object of the present invention is to provide a parking meter time cancellation mechanism of the character described which is designed for incorporation in existing meter clock mechanisms with a minimum required alteration of existing parts and at a point in the clock works which enables convenient factory assembly for incorporation in the original clock mechanism where such original incorporation is desired; and which involves a simple organization of co-functioning parts capable of affording dependable and durable operation throughout a long life expectancy.

Another object of the present invention is to provide a parking meter time cancellation mechanism of the character above wherein the time cancellation device may be embodied in substitution clock mechanism which may be quickly and readily substituted as a unitary sub-assembly in existing parking meters for the conversion of such parking meters to such time cancellation action.

The invention possesses other objects and features of advantage, some of which of the foregoing will be set forth in the following description of the preferred form of the invention which is illustrated in the drawing accompanying and forming part of this specification. It is to be understood however, that variations in the showing made by the said drawings and description may be adopted within the scope of the invention as set forth in the claims.

Referring to said drawings (4 sheets):

FIGURE 1 is a front elevation partly in section of the interior working parts of a parking meter incorporating the time-cancellation mechanism of the invention.

FIGURE 2 is a side elevation of the mechanism shown in FIGURE 1, as suggested by line 2—2 of FIGURE 1.

FIGURE 3 is a fragmentary rear elevation of a portion of the apparatus, taken as suggested by line 3—3 of FIGURE 2.

FIGURE 4 is a bottom view on an enlarged scale of a portion of the apparatus, taken substantially along the plane of line 4—4 of FIGURE 1.

FIGURE 5 is a bottom fragmentary cross-sectional view, on a further enlarged scale, of a portion of the apparatus shown in FIGURE 4.

FIGURE 6 is a fragmentary cross-sectional view showing one of the pinions in end elevation and is taken substantially on the plane of line 6—6 of FIGURE 5.

FIGURE 7 is a fragmentary side elevation of one of the teeth on the pinion shown in FIGURE 6, the view being taken as suggested by line 7—7 of FIGURE 6.

FIGURE 8 is a side elevation of a centrifugal weight illustrated in FIGURE 5, the view being taken as suggested by line 8—8 in FIGURE 5.

FIGURE 9 is a perspective view on a reduced scale of a parking meter and time cancellation mechanism of the present invention installed at a curb side.

FIGURE 10 is a bottom view similar to FIGURE 4, but showing a modified form of the invention, some of the gears being omitted for clarity of illustration.

FIGURE 11 is a fragmentary cross-sectional bottom view on an enlarged scale of a portion of the apparatus shown in FIGURE 10.

FIGURE 12 is a fragmentary cross-sectional view of a portion of the apparatus taken substantially along the plane of line 12—12 of FIGURE 11.

FIGURE 13 is a fragmentary cross-sectional bottom view on an enlarged scale similar to FIGURES 5 and 11 but showing a further modified form of the invention.

FIGURE 14 is a cross-sectional view of a valve structure used in the embodiment illustrated in FIGURE 13 and is taken substantially on the plane of line 14—14 of FIGURE 13.

The parking meter time cancellation mechanism of the present invention consists briefly of a clock mechanism 16 having an escapement 17 and a gear train 18 and including a shaft 19 and a gear 21 thereon having an entrained position as illustrated in FIGURE 5 providing a slow timed unwinding of the clock mechanism and a dis-entrained position, as depicted in dotted lines in FIGURE 5, permitting a rapid unwinding of the clock mechanism, an actuator 24 selectively displacing the gear 21 to and from its entrained and dis-entrained positions, and means 26 (FIGURE 9) connected to the actuator 24 and being adapted for mounting in a vehicle parking space 28 and being responsive to the positioning of the vehicle therein for controlling the energizing of the actuator 24. Preferably and as here shown, the unit 24 is composed of a pneumatic actuator and the means 26 here consists of a collapsible air tube formed of rubber or the like and which is mounted in a parking space 28 to be occupied by an automobile and in position for actuation by a wheel of the automobile, the wheel in traversing the air tube 26 causing its collapse and the sending of an air pulse through a connecting air line 27 to the actuator 24 in the meter head 29 mounted on a conventional standard 30 at the curb adjacent parking space 28. As a further feature of the present construction, the mechanism also includes a means 31, here in the form of a centrifugal governor, for holding the gear 21 in its dis-entrained position for the period of rapid unwinding of the clock mechanism.

As will be seen from FIGURE 5, the clock mechanism includes a support, here composed of a pair of spaced plates 32 and 33. Shaft 19 is here formed with end portions 34 and 35 extending through plates 32 and 33 so as to provide endwise displacement of the shaft and gear 21 carried thereby between the entrained and dis-entrained positions of the gear. Biasing means 36 here in the form of a small flat spring carried on plate 32 and engaging the end 34 of the shaft, constantly urges the shaft to its engaged position.

Pneumatic actuator 24 here includes a diaphragm 37 mounted at its periphery to a disc-like cover member 38 cooperating with the diaphragm to provide a pressure chamber 39. Member 38 is provided with an inlet fitting 41 which is connected to the line 27 leading to the air tube 26 in the vehicle parking space 28. A flexible spring arm 42 is mounted between the diaphragm 37 and shaft end 35 and serves as a bearing plate for the diaphragm against the shaft in urging the latter to an axially displaced position as depicted in dotted lines in FIGURE 5, against the resistance of spring 36, upon the receipt of an air pulse from the street hose 26.

The centrifugal governor 31 includes a weight 43 carried by the shaft 19 for rotation therewith and being pivotally mounted for rotation about a crosspin 44 set on perpendicular to the shaft 19, the weight having an eccentric center of gravity causing the weight to assume a first rotated position on the shaft when the shaft (shown in solid line in FIGURE 5) is at rest or rotating slowly, and a second rotated position on the shaft (shown in dashed line in FIGURE 5) during the rapid rotation of the shaft, and causing the weight to recover its first position upon subsequent slowing down of the shaft. It will be seen that shaft 19 is here mounted horizontally and that the weight has two major centers 56 and 57 which are substantially dynamically balanced upon opposite sides of the pivot axis 44, and are normally spaced from a pivot axis plane 53 perpendicular to the shaft, whereby the weight will be displaced by centrifugal force during rapid rotation of the shaft to swing the weight centers toward the plane 53, and to remain in this position during the high speed rotation. The weight 43 also carries means 54, here in the form of a pair of arms 58, engageable with the support 33 in its high speed rotated position to hold the shaft 19 in its dis-entrained position against the action of the biasing means 36. As here shown, weight 43 is formed as a T-shaped body pivoted to the shaft 19 medially of a pair of arms providing the major weight centers 56 and 57; and the arms 58 extend perpendicularly from arms 56 and 57 to engage plate 33 jointly with weight 56 for defining the rest and slow speed position of the weight. As the weight centers swing into alignment with plane 53, arms 58 move into a perpendicular shaft supporting position on plate 33 so as to thereby hold shaft 19 in its dis-entrained position during high speed rotation. As the shaft slows down the static imbalance provided by arms 58 which cause the weight to assume its above described slow speed position. To also aid in this respect, the arms 58 are formed with sharpened ends 59 for engagement with plate 33.

Escapement 17 includes an escapement lever 61 and an escape wheel 62 retained for slow halting timed rotation by the lever 61 to provide a timed unwinding of the clock mechanism. Escape wheel is here supported on a shaft 63 which also carries a pinion 64. Shaft 19 is mounted in parallel relation to shaft 63, and gear 21 on the shaft 19 is normally engaged with pinion 64 in the entrained position of gear 21 above discussed. As will be best seen from FIGURE 5, the teeth of gear 21 and pinion 64 extend generally parallel to each other for free sliding axial displacement between the gear and pinion. Accordingly as the gear 21 is displaced axially to its position indicated in dotted lines in FIGURE 5, the teeth on gear 21 will slide off from the ends 66 of the teeth on pinion 64 to thereby effect a disengagement of the driving connection between the pinion and gear.

As will be understood from the foregoing, the time cancellation function of the present mechanism is accomplished by the disentrainment of a pinion 64 and gear 21 whereby the gear train leading back to the clock spring 106 is released from regulation by the escapement, and accordingly the entire gear train turns without restraint from the escapement and due to the gear multiplication used in the clock works, relatively high speed rotation of gear 21, shaft 19, and weight 31 occurs for a period of several seconds until the clock spring 106 unwinds. As the rotation of shaft 19 slows down, weight 31 reorients, as above explained, and spring 36 urges the return movement of shaft 19 and the re-entrainment of gears 21 and 64 preparatory to the next actuation of the clock mechanism. It is, of course, imperative that there be a high degree of reliability in the re-entrainment of these gears since failure to properly re-entrain will result in failure of the next operation of the clock mechanism. The danger here is that the teeth on gear 21 may not at the instant of attempted re-entrainment line up with the valleys between the teeth of pinion 64, and in which case the gears will "hang up" out of mesh. In order to insure a positive orientation of the teeth of gears 21 and 64 for meshing upon relative approaching movement of these two gears, the end faces 66 of each of the teeth 65 at one of the approaching gear ends, here pinion 64, see FIGURES 6 and 7, is formed with an axially inclined cam slope which functions to engage the end face of a tooth of the other gear, here gear 21, to cause or produce circumferential relative driving displacement between the gears, so as to positively and always align the teeth of one gear with the valleys between the teeth of the other gear for foolproof slidable enmeshing of the teeth. The end tooth structure of pinion 64 is sort of an end face ratchet cut, so as to generate circumferential movement as required. The somewhat complex structure of these specially formed teeth is depicted only diagrammatically in FIGURE 5 and are developed in more precise detail in FIGURES 6 and 7.

A modified form of the invention is illustrated in FIGURES 10–12 of the drawings wherein the dis-entraining of the driving connection is effected between the escapement lever 61a and the escape wheel 62a. As will be observed from the drawing, the clock mechanism includes a balance wheel 67, escape wheel 62a, escapement lever 61a which has one end 68 in oscillating driving connection with the balance wheel and its opposite end 69 in detented driving connection with the escape wheel 62a to provide a slow timed unwinding of the clock mechanism and rotation of the escape wheel. As above noted, in this form of the invention, actuator means 24a is here used to effect a relative displacement of the lever and escape wheel to a disengaged position thereby permitting rapid unwinding of the clock mechanism, this actuator being responsive to the positioning of a vehicle in the vehicle parking space as in the first embodiment for controlling the operation of the actuator. As here shown, lever 61a and wheel 62a are mounted on spaced parallel shafts 70 and 63a, and actuator 24a functions to axially displace the wheel shaft 63a so as to move the wheel out of a detented engagement with lever 61a. The detented engagement is normally provided by a pair of spaced pins 71 and 72 carried by lever 61a and extending therefrom parallel to shafts 63a and 70 and into engagement with the toothed periphery 73 of escape wheel 62a, the arrangement being the conventional one wherein wheel 62a is alternatively engaged and released by the pins so as to translate the oscillations of the escape lever into a halting rotation of the wheel. Accordingly axial displacement of shaft 63a by actuator 24a will move wheel 62a out of the reach of pins 71 and 72. A return biasing spring 36a and a weighted centrifugal governor 31a is used in this embodiment in the same manner as in the first described embodiment.

To ensure rapid and easy installation, as for converting existing parking meters for time-cancellation action, the time-cancellation mechanism of the invention is designed to take advantage of a special feature of the art, which is that many existing styles of meter have the clockwork portions thereof designed as easily and rapidly replaceable units for replacement after wear or for changing the capacity of the meter in hours; and the mechanism of the present invention is accordingly structurally and operatively related entirely to such a replaceable clockwork unit so that the change may be made with as little alteration as possible of the existing mechanism. A typical parking meter head mechanism 81 is shown in FIGURE 1, and includes a violation signal flag 82, a purchased-time indicating hand 86 connected to the flag 82 for displaying the flag in a zero-time position 87 of the hand, a manually-operated, coin control crank shaft 88 functioning to move and set the hand 86 to indicate time purchased, and mounting means 89 for the clock mechanism here shown as a mounting plate and fasteners. The replaceable clock mechanism 16 is bodily mounted on means 89 and engages the head mechanism 81 to form an operative connection with the shaft 88 and hand 86 for driven winding of the clock mechanism upon progressive setting movement of the hand and for unwinding in regressive driving relation to the hand, to return the hand to zero-time position. As here shown the operative connection is made by a gear 91 forming part of the clock mechanism and engaging a segment gear 92, the later mounted on and revolving with shaft 88 and having the hand 86 extending therefrom. Turning of gear 91 and shaft 105 clockwise, as viewed in FIGURE 1, winds the mainspring 106 of the clock mechanism, and the return unwinding action of the mainspring is checked by dogs 101 and 102 engaging ratchet wheel 100 fixed to shaft 105. Dogs 101 and 102 are carried by a gear 99 which is journalled for rotation on shaft 105 and whose rotation is checked for timed rotation by a gear reduction trained, best seen in FIGURES 1, 2, and 4, leading to the escapement 17. This train includes pinion 93 enmeshed with gear 99 and mounted on a shaft carrying gear 98 which in turn meshes with a pinion on a shaft carrying gear 97 enmeshed with a pinion on a shaft carrying gear 96 enmeshed with a pinion 95 on shaft 19 which carries gear 21 enmeshed with pinion 64 on shaft 63 carrying the escape wheel 62. To complete the train, escape wheel 62 is checked for halting rotation by the escape lever 61 which is in turn checked for controlled oscillation by balance wheel 67, see FIGURE 12 which is controlled by balance wheel spring 94, see FIGURE 4.

When the central shaft 88 is actuated by the vehicle driver, through a coin acceptance mechanism (not shown), the gear 92 sets the timed purchased as by rotation counter-clockwise (FIGURE 1) and concurrently winds the clock mechanism by rotation of the gear 92 and shaft 105; and reverse rotation of the gear 99 as for either slow timed or rapid unwinding, as previously described, rotates ratchet wheel 100, shaft 105, gear 91, gear 92 and hand 86 back to zero position 87 on a scale 107. At zero position an extension 109 on the gear 92 engages a pin 111 on a lever 112, which is pivoted on a pin 113, and rotates the lever 112 to a "violation" position. The violation flag 82 is pivoted for vertical motion at the other end of the lever 112 and is balanced by a parallel linked and pivoted lever 116, having a counterweight 117 at the opposite end and pivoted on a second pin 118 for such vertical motion of the flag 82.

In operating the mechanism, the vehicle driver, after depositing his coin, turns the shaft 88 setting the pointer 86 at his bought time and lowering the violation flag 82. Simultaneously the mainspring 106 is wound and the escapement 17 begins oscillating to provide slow timed unwinding of the mechanism in return of the pointer 86 to zero position on the scale. If the vehicle driver drives his car away before zero position has been reached the vehicle wheel compresses the air tube 26, providing a pressure pulse to the diaphragm 37. The diaphragm 37 is displaced and bears through bearing member 42 against the end of the shaft 19 (63a), displacing the shaft to disentrained position and providing a rapid unwinding of the clock mechanism and return of the pointer 86 to zero position. Immediately upon beginning of rapid rotation of the shaft 19 (63a) the weight 43 assumes its second rotated position and the third arm 58 is extended toward the plate 33 to prevent return of the shaft to its first entrained position, and this disentrainment is perpetuated throughout the entire period of rapid rotation. When hand 86 is returned to zero position and the mainspring 106 is substantially unwound, the rotation of the weight 43 slows to the point where it reorients, due to its eccentric center of gravity, thus permitting return of the entrained position of the parts by biasing spring 36; the pressure on the diaphragm 37 having been relieved by passage of the vehicle away from the tube 26.

A further modified form of the invention is illustrated in FIGURES 13 and 14 wherein the time cancellation function is accomplished by disentrainment of gears 21b and 64b as in the first described embodiment but differing therefrom in that escape wheel shaft 63b is axially displaced to effect disentrainment rather than the adjacent shaft 19b. As will be understood, the clock time cancellation mechanism of the present invention differs from a standard clock mechanism in only a few details. In the form of the invention illustrated in FIGURE 13, all of the modifications are accomplished on a single shaft assembly, viz., a shaft 63b. This shaft is made with elongated end journals 121 and 122 to permit axial reciprocation through a stroke engaging and disengaging the teeth on gear 64b with teeth on gear 21b. Pinion 64b has the end faces of its teeth formed with the cam slopes illustrated in FIGURES 6 and 7 to facilitate and increase the reliability of re-engagement of the gears. In order to accommodate the reciprocation of shaft 63b and escape wheel 62b thereon, the two pins, here labelled 71b, of the escapement lever 61b are of a length retaining their engagement with the teeth 73b of the escape wheel 62b, as illustrated in FIGURE 12, at all displaced positions of wheel 62b. The range of such displacement is illustrated in full and dashed lines in FIGURE 13, and it will be noted that no disentrainment between escapement lever 61b and wheel 62b occurs. The opposite end of the escapement lever 61b is connected in the usual manner to the balance wheel 67b, as illustrated in FIGURES 12 and 13.

The relative positions of pneumatic acutator 24b and biasing spring 36b are reversed in this embodiment as compared with the first described embodiment due to displacement of shaft 63b rather than shaft 19b. As here shown, actuator 24b is mounted adjacent frame side 32b for engagement and displacement of shaft end 121 and biasing spring 36b is mounted on frame side 33b for engagement with shaft end 122. The structure is also simplified in that weight 54 is deleted and another means provided for holding gears 64b and 21b disentrained for the period of rapid spinning of gear 21b. This means here includes a check valve 123 mounted in the air line 124 connecting the street sensing tube 26, see FIGURE 9, with the pneumatic actuator 24b and which is constructed for trapping and holding and slowly releasing an air pulse received from tube 26 so as to maintain shaft 63b and gear 64b in disentrained position against the resistance of spring 36b for at least the period of rapid unwinding of the mechanism. Valve 123 here includes a housing 126 formed with an interior valve chamber 127 containing a ball valve 128 normally urged to its seat by a spring 131. The ball is displaced from its seat by an incoming pressure pulse through conduit 132 leading from the air tube 26, and the pressure is maintained within the chamber 39b of actuator 24b by the closing of valve 28 on its seat by spring 131. A small bleeder opening 133 is provided in housing 126 for relieving the pressure in chamber 29b with time so as to develop the delayed return of shaft 63b.

Another condition which must be met by the present device in field operation is the occasional parking of a motorist with one of the vehicle wheels resting on the air tube 26. Normally tube 26 is so positioned that this condition will not occur when the vehicle is properly parked. In the present invention, means is provided responsive to a vehicle wheel standing on tube 26 to release the generated pressure in the pneumatic system to thereby cause a re-entraining of the parts for proper operation of the parking meter. This means is simply accomplished by the provision of a bleeder port 134 in the cover member 38 of the pneumatic actuator in the form of the invention illustrated in FIGURE 5; 134a in FIGURE 11; and a bleeder passage 134b in the valve seat 129 in the form illustrated in FIGURES 13 and 14. Bleeder ports and passages 134, 134a and 134b relieve the pressure in the pneumatic actuator chamber within the period which occurs between the time the motorist gets out of his parked vehicle and walks up to and actuates the parking meter, thus restoring meter operation preparatory to the receipt of the motorist's coin. When the motorist moves his vehicle off from the street tube 26, the tube will immediately expand taking in air through ports 134, 134a, 134b and it is likely that the motorists in making one or more short passes within the parking space in driving out will again cause one of the vehicle wheels to traverse the street tube and trip the meter. If this does not occur it is intended that the next motorist entering the parking space will in properly placing his vehicle therein cause one of the vehicle wheels to run over the tube and thus cancel any remaining time on the meter.

We claim:

1. In a clock mechanism, a support, a main spring, an escapment, a gear train connection between said spring and escapement and including a shaft carried by said support for endwise displacement, a gear on said shaft and movable axially therewith between a first entrained position providing a slow timed unwinding of said clock mechanism and a slow rotation of said shaft and a second disentrained position permitting rapid unwinding of said clock mechanism and rapid rotation of said shaft, means biasing said shaft to said first position, means displacing said shaft to said second position against the resistance of said last named biasing means, a weight carried by said shaft for rotation therewith and being pivotally mounted for rotation about an axis perpendicular to said shaft, said weight having weight centers causing said weight to assume a first rotated position on said shaft when the shaft is rotating at said slow rotation and a second rotated position on the shaft during said rapid rotation, and means carried by said weight and engageable with said support in said second rotated position to hold said shaft in said second disentrained position against the action of said biasing means during said rapid unwinding of said clock mechanism.

2. In a clock mechanism, a support, a mainspring, an escapement, a gear train connection between said mainspring and escapement and including a shaft carried by said support for endwise displacement, a gear on said shaft and movable axially therewith between a first entrained position providing a slow timed unwinding of said clock mechanism and a slow rotation of said shaft and a second dis-entrained position permitting rapid unwinding of said clock mechanism and rapid rotation of said shaft, means biasing said shaft to said first position, means displacing said shaft to said second position against the resistance of said last named biasing means, a weight carried by said shaft for rotation therewith and being pivotally mounted for rotation about an axis perpendicular to said shaft, said weight having a first rotated position at rest and during said slow rotation with a center of mass spaced from said shaft and having a second rotated position with said center of mass displaced by centrifugal force toward said shaft during said high speed rotation, and means carried by said weight and engageable with said support in said rotated position to hold said shaft in said second position against the action of said biasing means during said rapid unwinding of said clock mechanism.

3. In a clock mechanism, a pair of spaced support plates, a mainspring, an escapement, a gear train connection between said spring and escapement and including a shaft carried by and having ends extending through said plates for endwise displacement, a gear on said shaft and movable axially therewith between a first entrained position providing a slow timed unwinding of said clock mechanism and a slow rotation of said shaft and a second dis-entrained position permitting rapid unwinding of said clock mechanism and rapid rotation of said shaft, a spring mounted on one of said plates and engaging one end of said shaft and urging said shaft to said first position, a pneumatic diaphragm mounted on the other plate and engaging the other end of said shaft and selectively displacing said shaft to said second position against the resistance of said spring, a weight carried by said shaft for rotation therewith and being pivotally mounted for rotation about an axis perpendicular to said shaft, said weight having a position at rest and during said slow rotation with a center of mass spaced from said shaft and having a rotated position with said center of mass displaced by centrifugal force toward said shaft during said high speed rotation, and means carried by said weight and engageable with said support in said rotated position to hold said shaft in said second position against the action of said biasing means during said rapid unwinding of said clock mechanism.

4. A clock mechanism as characterized in claim 2 wherein said weight is formed as a T-shaped body pivoted to said shaft medially of a pair of first arms to provide a pair of dynamically balanced weight centers on opposite sides of said pivot, said body having a generally perpendicular related third arm arranged with one of said first arms to engage said support for defining said rest position, said weight centers causing the rotation of said body on its pivot during said high speed rotation of said shaft to define said second rotated position and said third arm being positioned against said support in said second rotated position to hold said shaft in said second position against the action of said biasing means.

5. A clock mechanism as characterized in claim 4 wherein said shaft is mounted horizontally and said weight is eccentrically pivoted to the shaft for gravitating from said second rotated position to said first rotated position when said shaft is at rest and when the shaft is rotating at said slow rotation, and said third arm terminates in a sharpened end for engaging said support in said second rotated position to aid in the return of said weight to its first rotated position.

6. A clock time cancellation mechanism comprising, a mainspring and an escapement and a gear train connection therebetween including a shaft and a gear thereon having a first entrained position providing a slow timed unwinding of said spring and a second disentrained position permitting a rapid unwinding of said spring means biasing said shaft and gear to entrained position, a pneumatic actuator connected for displacing said shaft and gear to disentrained position, a collapsible air tube connected to said actuator and being adapted for mounting in the parking space to be occupied by a vehicle for collapse by a wheel of the vehicle to thereby generate air pressure for energizing said actuator to displace said shaft and gear to disentrained positioned against the resistance of said biasing means, and means responsive to a vehicle wheel standing on said tube to release the generated pressure to thereby cause re-entraining of said shaft and gear by said biasing means.

7. A clock time cancellation mechanism as set forth in claim 6 wherein the escapement comprises a balance wheel, an escape wheel and an escapement lever, the lever having one end in oscillating driving connection with the balance wheel and its opposite end in detented driving connection with the escape wheel to provide a slow timed unwinding of the clock mechanism and rotation of said escape wheel, the pneumatic actuator effecting a relative displacement of said lever and escape wheel to a disengaged position thereby permitting rapid unwinding of said clock mechanism and said escape wheel.

8. A clock time cancellation mechanism as set forth in claim 7 wherein said escapement lever and said escape wheel are mounted on spaced parallel shafts and include a pair of spaced pins carried by said lever and extending thereof parallel to said shafts and a tooth periphery on said wheel alternately engaged and released by said pins to translate the oscillations of said lever into a halting rotation of said wheel and said actuator means functioning to axially displace said wheel shaft to move said wheel out of the reach of said pins.

9. A clock time cancellation mechanism as set forth in claim 8 wherein means are included to hold said escape wheel in its axially displaced position out of reach of said pins during the high speed rotation of said escape wheel.

10. In a clock mechanism adapted for time cancellation, an escapement mechanism including an escapement lever and an escape wheel retained for slow halting time rotation by said lever to provide a timed unwinding of said clock mechanism, a first shaft supporting said wheel for rotation, a pinion carried by said first shaft, a second shaft mounted in parallel relation to said first shaft, a gear on said second shaft engaged with said pinion, and actuator means effecting an axial displacement of one of said shafts to disentrain said gear and pinion to permit rapid unwinding of said clock mechanism.

11. A parking meter time cancellation mechanism as characterized in claim 10 and for mounting in association with a vehicle parking space wherein said actuator means is pneumatically operated by an air pulse, a collapsible air tube connected to said actuator and being adapted for mounting in said parking space for collapse by a wheel of the vehicle to thereby generate an air pressure pulse for energizing said actuator, and means responsive to a vehicle wheel standing on said tube to release the generated pressure to thereby cause reentraining of said pinion and gear by said biasing means.

12. A parking meter time cancellation mechanism as characterized in claim 11 and for mounting in association with a vehicle parking space wherein said actuator means is pneumatically operated by an air pulse, means responsive to a vehicle leaving said space for generating an air pulse for energizing said actuator means, and means trapping and holding and slowly releasing said air pulse so as to maintain said gears in disentraining position against the resistance of said biasing means for at least the period of rapid unwinding of said spring.

13. In a parking meter time cancellation mechanism, a main spring and an escapement and a gear train connecting said spring and escapement for slow timed unwinding of said spring when the latter is wound, said escapement including an escape lever and escape wheel and mounting shaft therefor, retained for slow halting timed rotation by said lever, a first shaft supporting said wheel for rotation, a second parallel shaft, entrained gears on said shafts forming part of said train and having gear teeth formed for axial sliding displacement between entraining position and disentraining position with end faces of said teeth moved into spaced opposed relation, said gears in disentraining position permitting rapid unwinding of said spring and stopping of rotation of said gears, means biasing said gears to entraining position, actuator means connected for moving said gears to disentraining position against the action of said biasing means, the teeth of one of said gears being formed at said end faces with cam faces inclined with respect to the axial movement of the teeth of the other gear when moved into contact therewith during the reentraining of said teeth, said biasing means and cam faces cooperating to provide upon contacting of the abutting teeth in non-meshing position for automatic relative rotation of said gears into meshing engagement.

14. A parking meter time cancellation mechanism as characterized in claim 13 and for mounting in association with a vehicle parking space wherein said actuator means is pneumatically operated by an air pulse, a collapsible air tube connected to said actuator and being adapted for mounting in said parking space for collapse by a wheel of the vehicle to thereby generate an air pressure pulse for energizing said actuator, and means responsive to a vehicle wheel standing on said tube to release the generated pressure to thereby cause reentraining of said pinion and gear by said biasing means.

15. A parking meter time cancellation mechanism as characterized in claim 13 and for mounting in association with a vehicle parking space wherein said actuator means is pneumatically operated by an air pulse, a collapsible air tube having an air line connected to said actuator and being adapted for mounting in said parking space for traversing of said tube by a wheel of the vehicle upon leaving said space to thereby generate an air pressure pulse for energizing said actuator, and check valve means and restricted air ports connected and provided in said air line functioning to trap and hold and slowly release said air pulse so as to maintain said pinion and gear in disentraining position against the resistance of said biasing means for at least the period of said rapid unwinding of said spring, and being responsive to the condition of a vehicle wheel standing on said tube to release the generated pressure to thereby cause reentraining of said pinion and gear by said biasing means.

References Cited in the file of this patent
UNITED STATES PATENTS

| | | |
|---|---|---|
| 576,983 | Johnson | Sept. 22, 1896 |
| 1,973,275 | Babson | Sept. 11, 1934 |
| 2,097,487 | Kinnear | Nov. 2, 1937 |
| 2,427,653 | Banker | Sept. 23, 1947 |
| 2,505,449 | Wemp | Apr. 25, 1950 |
| 2,505,573 | Prophet | Apr. 25, 1950 |
| 2,519,634 | Burton | Aug. 22, 1950 |
| 2,568,122 | Gallagher et al. | Sept. 18, 1951 |
| 2,721,441 | Boyles | Oct. 25, 1955 |
| 2,821,283 | Cruse | Jan. 28, 1958 |
| 2,945,341 | Griffin et al. | July 19, 1960 |
| 2,983,097 | Ewing | May 9, 1961 |
| 3,015,208 | Armer | Jan. 2, 1962 |
| 3,054,251 | Handley et al. | Sept. 18, 1962 |
| 3,064,416 | Armer | Nov. 20, 1962 |

FOREIGN PATENTS

| | | |
|---|---|---|
| 525,279 | Germany | May 21, 1931 |